United States Patent
Roh (10) Patent No.: US 7,639,577 B2
(45) Date of Patent: *Dec. 29, 2009

(54) OPTICAL RECORDING MEDIUM AND METHOD FOR RECORDING OR REPRODUCING DATA ON OR FROM THE OPTICAL RECORDING MEDIUM HAVING AN OPTIMUM RECORDING CONDITION INFORMATION

(75) Inventor: Jin-Tae Roh, Kyounggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/866,720

(22) Filed: Jun. 15, 2004

(65) Prior Publication Data

US 2004/0264330 A1 Dec. 30, 2004

Related U.S. Application Data

(63) Continuation of application No. 09/664,360, filed on Sep. 18, 2000, now Pat. No. 7,154,829.

(30) Foreign Application Priority Data

Sep. 18, 1999 (KR) .............................. 1999-40306

(51) Int. Cl.
*G11B 15/52* (2006.01)
(52) U.S. Cl. ................. 369/47.53; 369/53.27
(58) Field of Classification Search ............. 369/47.55, 369/47.53, 44.55, 44.53, 59.11, 53.1, 53.26, 369/53.31; *G11B 15/52, 7/125, 20/10, 7/00, G11B 5/09*

See application file for complete search history.

(56) References Cited

U.S. PATENT DOCUMENTS

| 4,996,678 | A | | 2/1991 | Maeda |
| 5,226,027 | A | | 7/1993 | Bakx |
| 5,249,166 | A | | 9/1993 | Hamilton et al. |
| 5,305,296 | A | | 4/1994 | Kono |
| 5,502,702 | A | | 3/1996 | Nakajo |
| 5,568,467 | A | * | 10/1996 | Inagaki et al. ............ 369/47.43 |
| 5,602,814 | A | | 2/1997 | Jaquette et al. |
| 5,717,679 | A | * | 2/1998 | Mashimo et al. ....... 369/124.04 |
| 5,721,856 | A | * | 2/1998 | Takeuchi ....................... 711/1 |
| 5,761,169 | A | | 6/1998 | Mine et al. |
| 5,802,032 | A | * | 9/1998 | Jacobs et al. ............. 369/59.11 |

(Continued)

FOREIGN PATENT DOCUMENTS

JP 8-7369 A 1/1996

(Continued)

*Primary Examiner*—Paul Huber
(74) *Attorney, Agent, or Firm*—Birch, Stewart, Kolasch & Birch, LLP (57) ABSTRACT

An optical recording medium and method for recording/reproducing data on/from the optical recording medium having an optimum recording condition information, are provided. The method includes reading out a reference recording condition recorded on a specific area of the optical recording medium; recording test data while varying a recording condition with respect to the reference recording condition; determining an optimum recording power based on reproduction characteristics of the test data; and recording a recoding condition data including the optimum recording power, recording speed and write strategy type to be used or used to record data, on a specific area of the optical recording medium.

29 Claims, 9 Drawing Sheets

U.S. PATENT DOCUMENTS

| | | | |
|---|---|---|---|
| 5,818,807 A | 10/1998 | Kuroda et al. | |
| 5,862,008 A | 1/1999 | Yamada et al. | |
| 5,872,763 A * | 2/1999 | Osakabe | 369/47.53 |
| 5,898,655 A * | 4/1999 | Takahashi | 369/47.53 |
| 6,034,936 A | 3/2000 | Ogawa et al. | |
| 6,052,347 A | 4/2000 | Miyata | |
| 6,091,686 A * | 7/2000 | Caffarelli et al. | 369/53.24 |
| 6,128,257 A * | 10/2000 | Zhou et al. | 369/30.37 |
| 6,208,601 B1 * | 3/2001 | Shimizu et al. | 369/53.19 |
| 6,243,339 B1 * | 6/2001 | Spruit et al. | 369/53.13 |
| 6,256,282 B1 | 7/2001 | Yamagami et al. | |
| 6,359,846 B1 | 3/2002 | Shoji et al. | |
| 6,370,545 B1 | 4/2002 | Shaath | |
| 6,404,707 B1 | 6/2002 | Kaneda et al. | |
| 6,404,712 B1 * | 6/2002 | Lee et al. | 369/47.53 |
| 6,411,574 B1 | 6/2002 | Su et al. | |
| 6,411,575 B1 | 6/2002 | Akiyama et al. | |
| 6,646,965 B1 | 11/2003 | Kim | |
| 6,678,228 B1 | 1/2004 | Kando et al. | |
| 6,687,194 B1 | 2/2004 | Kobayashi et al. | |
| 6,704,269 B1 * | 3/2004 | Ogawa | 369/116 |
| 7,061,841 B2 * | 6/2006 | Chiba et al. | 369/53.15 |
| 7,154,829 B1 | 12/2006 | Roh | |
| 7,170,825 B2 * | 1/2007 | Takahashi | 368/66 |

FOREIGN PATENT DOCUMENTS

| | | |
|---|---|---|
| JP | 08-007369 A | 1/1996 |
| JP | 9-16964 A | 1/1997 |
| JP | 09-016964 A | 1/1997 |

\* cited by examiner

Prior Art

'Minute' Byte when M1 : S1 : F1 = 101

| W1,W2,W3 | = 000 | → | $P_{ind}$ = 5mw |
|---|---|---|---|
| | = 001 | → | $P_{ind}$ = 6mw |
| | = 010 | → | $P_{ind}$ = 7mw |
| | = 011 | → | $P_{ind}$ = 8mw |
| | = 100 | → | $P_{ind}$ = 9mw |
| | = 101 | → | $P_{ind}$ = 10mw |
| | = 110 | → | $P_{ind}$ = 11mw |
| | = 111 | → | $P_{ind}$ = 12mw |

{ W1,W2,W3 : Indicative Target Writing Power($P_{ind}$)
  X1 : Reserved Future Extensions(=0)
  V1, V2, V3 : Reference Speed

Fig.3

Prior Art

Degree of modulation(m)=$I_{11T}/I_{Top}$

'Second' Byte when M1 : S1 : F1 = 001

{ P1,P2,P3 : Power multiplication factor p at reference speed
G1,G2,G3 : Target $r$ value of the modulation/power function for all speeds
Y1 : Reserved for future extentions(=0000)

Prior Art

|  | PRECEDING RECORDING | FOLLOWING RECORDING | REPRODUCTION CHARACTERISTICS |
|---|---|---|---|
| RECORDING POWER | HIGH | LOW | BAD |
|  | HIGH | HIGH | NORMAL |
|  | LOW | HIGH | GOOD |
|  | LOW | LOW | NORMAL |

| APPARATUS A | APPARATUS B | APPARATUS C |
|---|---|---|
| 8.5mw | 8mw | 9.5mw |

OPTICAL RECORDING MEDIUM AND METHOD FOR RECORDING OR REPRODUCING DATA ON OR FROM THE OPTICAL RECORDING MEDIUM HAVING AN OPTIMUM RECORDING CONDITION INFORMATION

This application is a Continuation of application Ser. No. 09/664,360, filed on Sep. 18, 2000 now U.S. Pat. No. 7,154,829, and for which priority is claimed under 35 U.S.C. § 120; and this application claims priority of Application No. 40306/1999 filed in Korea on Sep. 18, 1999 under 35 U.S.C. § 119; the entire contents of all are hereby incorporated by reference.

BACKGROUND OF THE INVENTION

1. Field of the Invention

The present invention relates to an optical recording medium and method for recording or reproducing data on and from the optical recording medium having an optimum recording condition information.

2. Description of the Conventional Art

Figure 1:
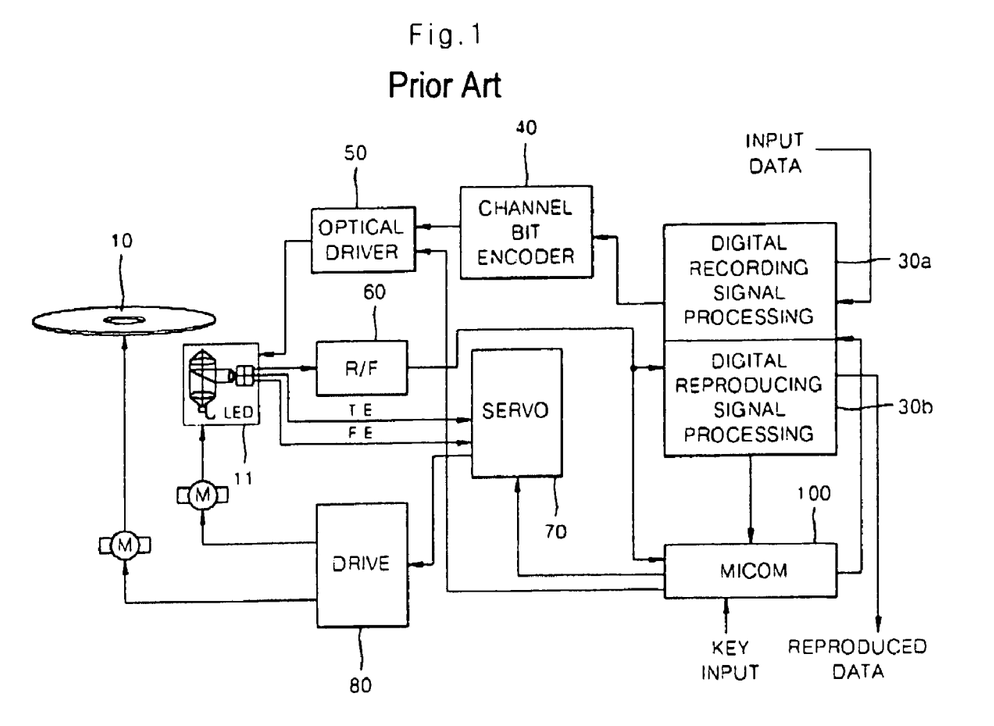
FIG. 1 is a block diagram illustrating the configuration of a general optical recording/reproducing apparatus.

FIG. 1 illustrates the configuration of an optical recording/reproducing apparatus for recording data on an optical recording medium and reproducing the recorded data.

As shown in FIG. 1, this optical recording/reproducing apparatus includes a digital recording signal processing unit 30a for adding an error correction code (ECC) to input digital data, thereby converting the input digital data into a recording format, a channel bit encoder unit 40 for re-converting the data, converted into the recording format, into a bit stream, an optical driver unit 50 for outputting a light amount drive signal, an optical pick-up unit 11 for recording a desired signal onto an optical recording medium 10 in accordance with the light amount drive signal, and detecting a recording signal from the optical recording medium 10, and a drive unit 80 for driving the optical pick-up unit 11 and a motor M. The optical recording/reproducing apparatus further includes an R/F unit 60 for filtering a signal detected by the optical pick-up unit 11, conducting a waveform shaping for the filtered signal, and converting the resultant signal into a binary signal, a serve unit 70 for controlling the driving of the drive unit 80, based on signals indicative of tracking errors and focusing errors generated in the optical pick-up unit 11, along with the rotating speed of the optical recording medium 10, a digital reproduced signal processing unit 30b for recovering the binary signal into original data at a clock synchronizing with the binary signal, and a microcomputer 100 for controlling the recording/reproducing procedure.

Now, an operation of the above mentioned optical recording/reproducing apparatus will be described in conjunction with FIG. 1.

When a data recording request is inputted to the microcomputer 100 under the condition in which an optical recording medium 10 is loaded in a tray not shown, the optical recording/reproducing apparatus conducts an optimal power calibration (OPC).

Figure 2:
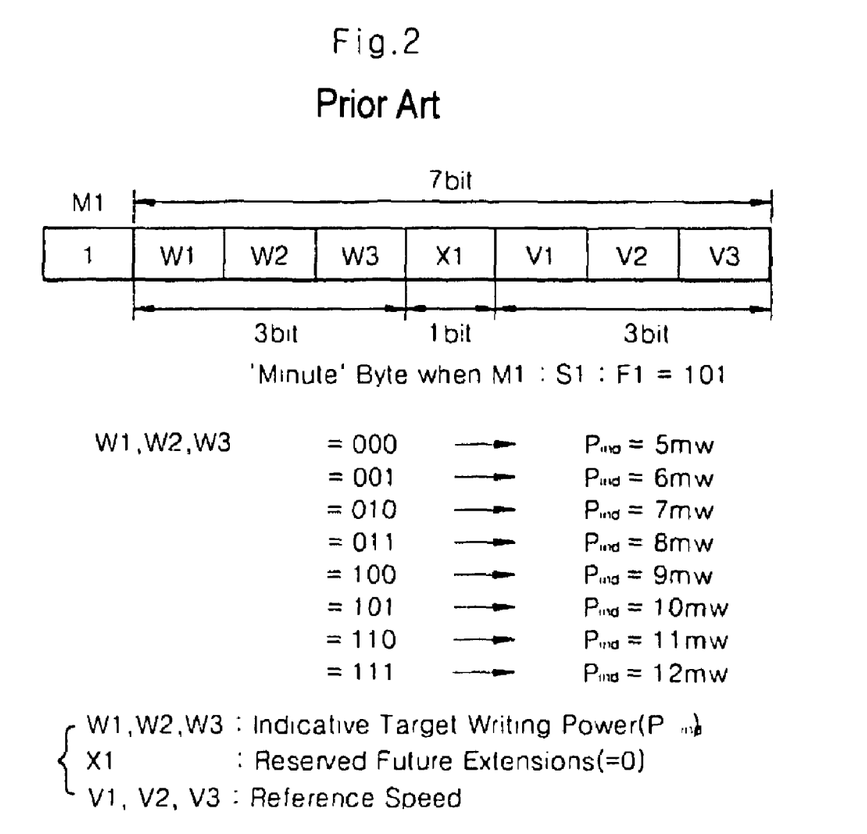
FIG. 2 is a diagram illustrating the data format for a reference power value recorded on a re-writable optical recording medium.

In accordance with the OPC procedure, the microcomputer 100 controls the servo unit 70 and the drive unit 80 prior to recording of input data. In accordance with controlled operations of the servo unit 70 and drive unit 80, the optical pick-up unit 11 is controlled to read out a target writing power value $P_{ind}$ recorded in the form of 3-bit data W1, W2, and W3. FIG. 2 illustrates an example of the target writing power value recorded in the form of 3-bit data on the optical recording medium 10.

Figure 3:
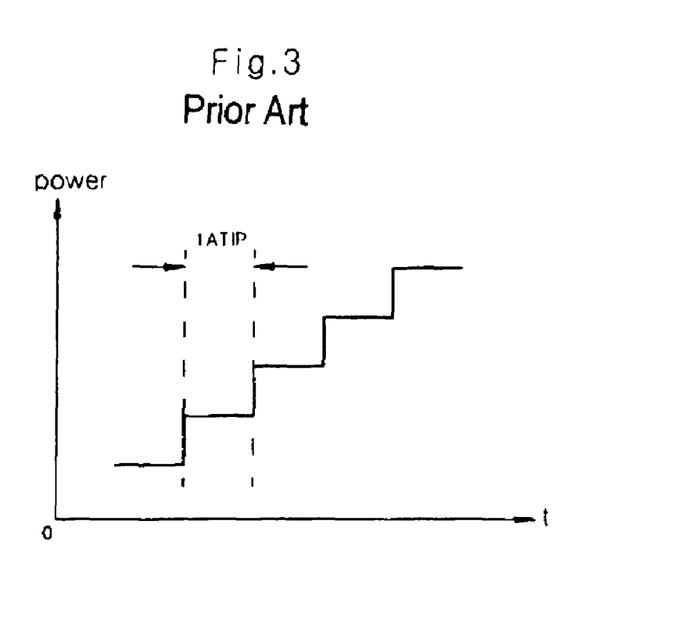
FIG. 3 is a graph illustrating a variation in optical power with reference to a reference recording power value in the recording of test data.
Figure 4:
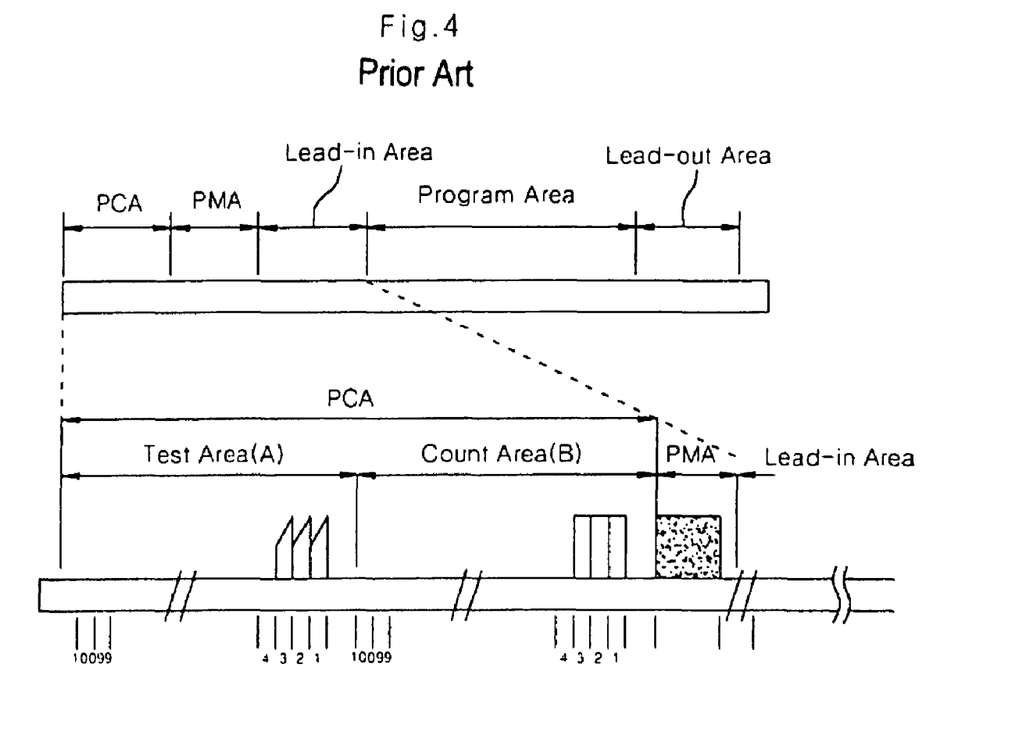
FIG. 4 is a view illustrating a recording signal test area A in a re-writable optical recording medium, along with a count area B for recording the number of test times.

The microcomputer 100 then applies an adjustment signal to the optical driver unit 50 in a variable fashion. The adjustment signal is adapted to vary an optical power with reference to the read target recording power value, for example, 8 mW. FIG. 3 illustrates a variation in optical power with reference to a target recording power value. The optical driver unit 50 outputs a recording signal for test data at an optical drive power corresponding to the adjustment signal. In accordance with the recording signal, the optical pick-up unit 11 records test data onto a test recording area of the optical recording medium 10. FIG. 4 illustrates a recording signal test area A in a re-writable optical recording medium (CD-RW), along with a count area B for recording the number of test times.

Figure 5:
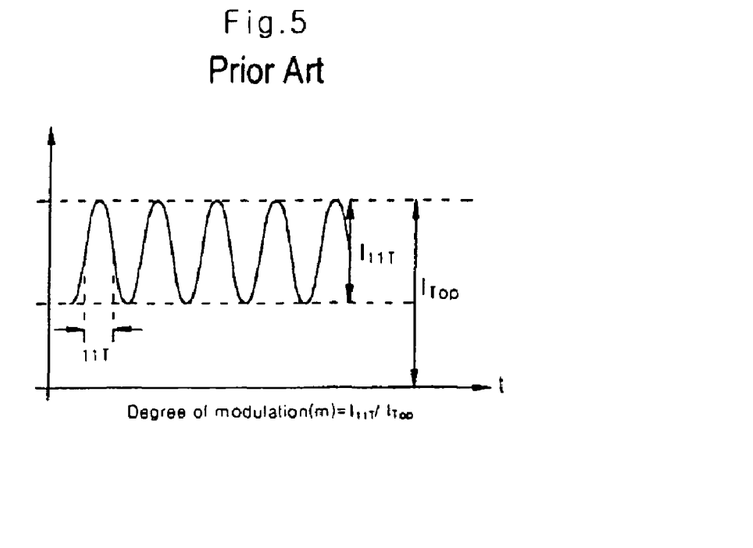
FIG. 5 is a waveform diagram illustrating a reproduced signal for the test data recorded on the optical recording medium.

The microcomputer 100 controls the pick-up unit 11 in a state, in which test data is recorded on the test area A of the optical recording medium 10, as shown in FIG. 4, in order to sequentially read out test data recorded several times. Each of the test data sequentially read is applied to the R/F unit 60 which, in turn, conducts a filtering and a waveform shaping for the test data, thereby reproducing that test data. FIG. 5 illustrates a reproduced signal for the test data recorded on the optical recording medium.

The microcomputer 100 then calculates the degree of modulation, based on the reproduced signal, and estimates a polynomial expression for a modulation degree curve (m=f(p)), using a curve filtering.

The modulation degree m corresponds to a value of $I_{11T}/I_{TOP}$ (m=$I_{11T}/I_{TOP}$). Here, "$I_{11T}$" represents the amplitude of the reproduced signal for an 11T signal, and "$I_{TOP}$" represents a peak value of the 11T signal.

Figure 6:
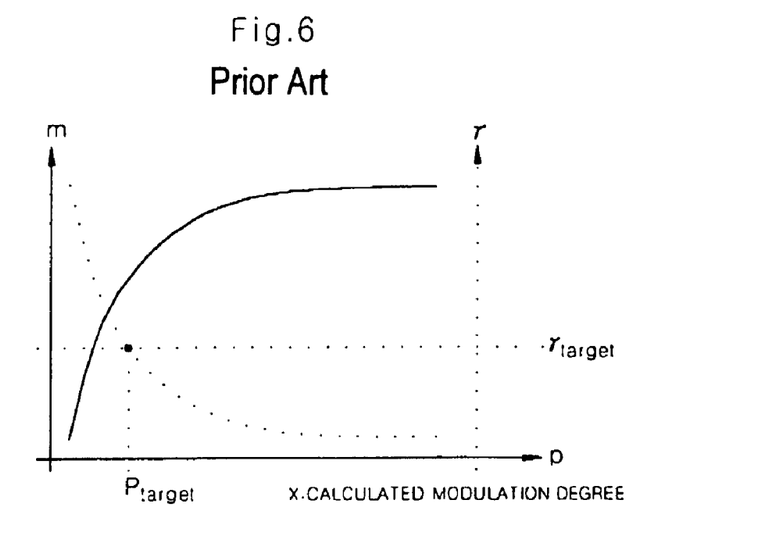
FIG. 6 is a graph depicting a modulation degree curve and a γ curve for detecting an optimum recording power value.

Next, a γ curve is derived using the estimated modulation degree curve "m=f(p)".

FIG. 6 illustrates a modulation degree curve "m=f(p)" and a γ curve "γ=g(p)" for detecting an optimum recording power value. Here, an expression "γ=p/m×f'(p)" is established.

Figure 7:
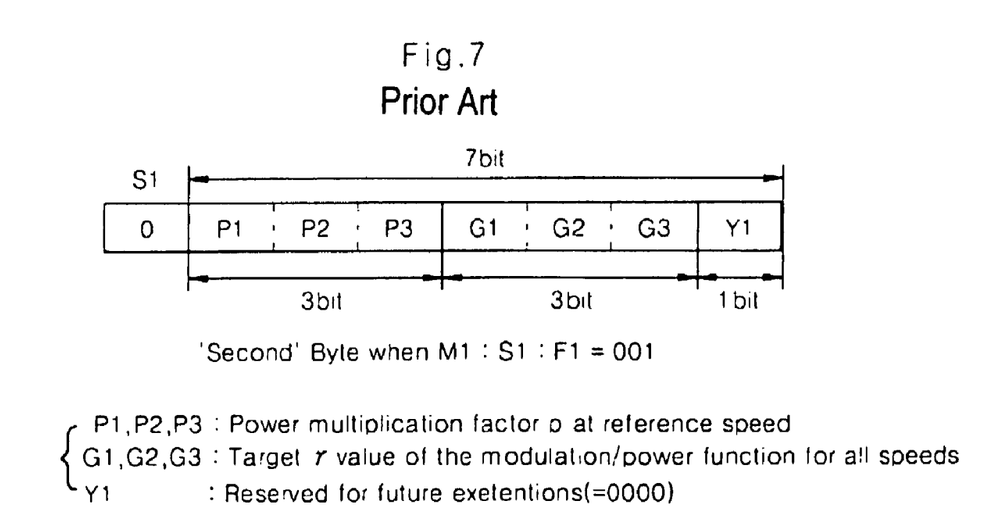
FIG. 7 is a diagram illustrating respective data formats for γ and β values recorded on the optical recording medium.

Also, the value of a target γ recorded on the optical recording medium 10 is read out. Based on the read target γ value, an optimum optical power is derived. FIG. 7 illustrates respective data formats of γ and ρ values recorded on the optical recording medium 10.

The microcomputer 100 controls the optical driver unit 50 to output, for the input data, a recording signal according to the optimum optical drive power detected in the above mentioned procedure. The optical drive unit 50 applies, to the optical pick-up unit 11, the recording signal according to the optical drive power, thereby allowing a pulse-width-modulated signal to be recorded onto a program area of the optical recording medium 10.

In accordance with a conventional data recording method applied to the above mentioned optical recording/reproducing apparatus, however, the detection of the optimum optical drive power should be conducted using the result of the recording of test data when every data is to be recorded on the optical recording medium. That is, the detection of the optimum optical drive power should be repeatedly conducted for all data to be recorded. For this reason, there is a problem in that the data recording time is delayed.

In order to solve this problem, the following technique has been proposed.

That is, the microcomputer 100, which is a microcomputer internally equipped with a memory, is configured to detect an optimum recording power value based on the recording and reproduction characteristics of test data, as mentioned above, and to record the detected optimum recording power value onto a designated particular area of an optical recording medium 10, along with an intrinsic recorder identification code for the optical recording/reproducing apparatus previously stored in the memory, that is, information for identifying the optical recording/reproducing apparatus, in order to reserve those information.

When an optical recording medium 10 is subsequently inserted into the recording/reproducing apparatus for recording of data, the microcomputer 100 reads out an optimum recording power value and an intrinsic recorder identification code from a particular area of an optical recording medium 10.

The microcomputer 100 then compares the read intrinsic recorder identification code with the intrinsic recorder identification code of the optical recording/reproducing apparatus. When the microcomputer 100 determines that the read intrinsic recorder ID code corresponds to the intrinsic recorder ID code of the optical recording/reproducing apparatus, it conducts recording of data using an optimum power identified from the optical recording medium 10 without conducting the procedure for detecting an optimum recording power.

However, where there is no optimum recording power value stored in the optical recording medium 10 or where the intrinsic recorder ID code read out from the optical recording medium 10 does not correspond to the intrinsic code of the recording/reproducing apparatus, the microcomputer 100 conducts the procedure for detecting an optimum recording power, that is, an OPC procedure, because the optimum power value stored in the optical recording medium 10 is that detected and recorded by a recording apparatus other than the above mentioned recording/reproducing apparatus. An optimum recording power value detected in the OPC procedure is then recorded onto the optical recording medium 10, along with the intrinsic recorder ID code of the recording/reproducing apparatus. Thereafter, desired data is recorded onto the optical recording medium 10 using the optimum power detected in the OPC procedure.

Thus, it is possible to more or less reduce the data recording time.

Figure 8:
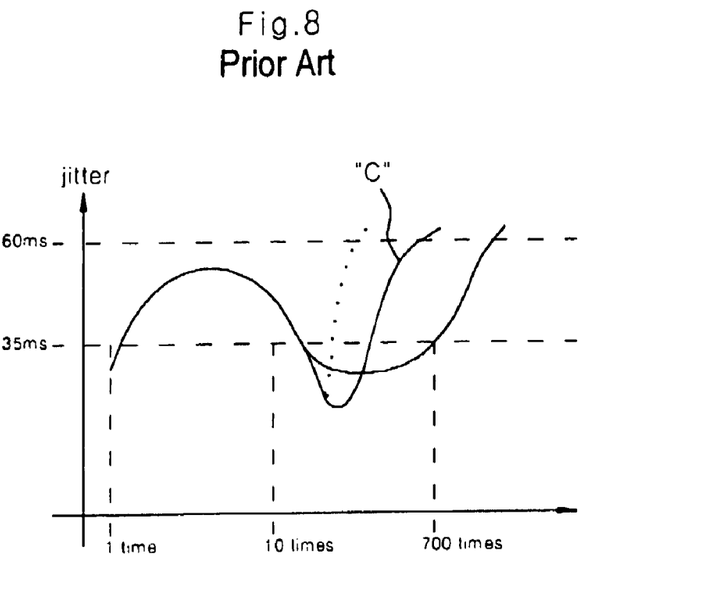
FIG. 8 is a graph illustrating a variation in jitter depending on the number of data overwrite times.
Figure 9:
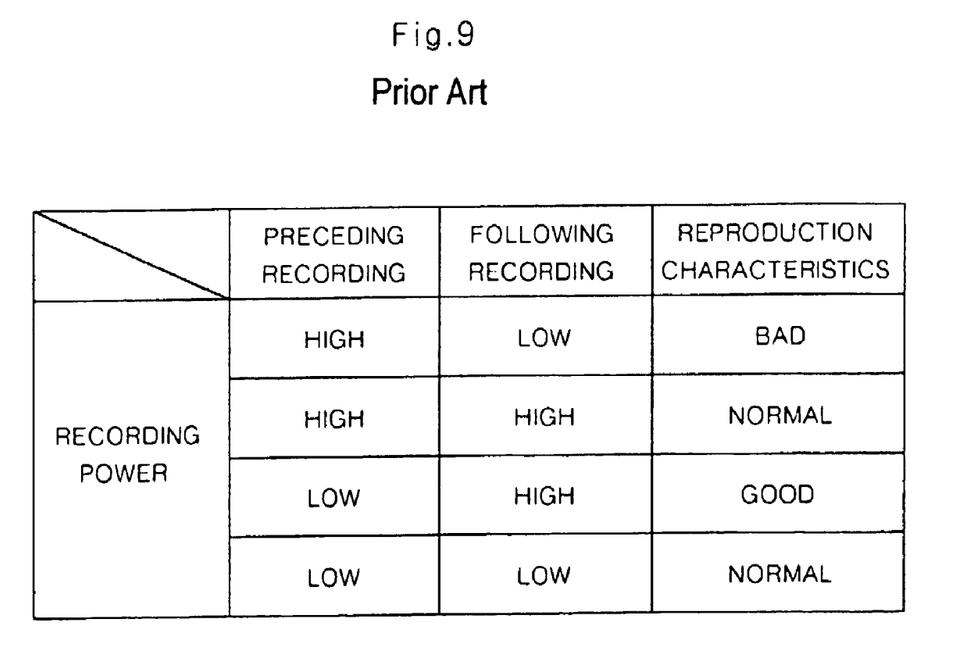
FIG. 9 is a table illustrating a variation in the reproduction characteristics of the optical recording medium depending on a variation in recording power value.

Meanwhile, where recording of data is repeated on a re-writable recording medium in an overwrite fashion, there may be a degradation at side portions of recording marks subjected to an image variation. As a result, a degradation in data recording characteristics may occur. In particular, when the recording apparatus overwrites data at a recording power lower than that used upon the previous data recording, the degradation in data recording characteristics becomes more severe, thereby resulting in increased errors in reproduced signals. FIG. 8 illustrates a relation of the amount of jitters involved in recorded data with respect to the number of data overwrite times. Also, FIG. 9 illustrates a degradation in reproduction characteristics varying depending on a variation in recording power between successive recording procedures.

The above mentioned problem is also involved in the method using the optimum power value along with the recorder ID code. That is, although recording of data is carried out using the power value derived in accordance with an OPC procedure when the recorder ID code detected from the optical recording medium is different from the identification code of the recording apparatus, it is difficult to expect satisfactory reproduction characteristics when the derived power value is not more than the power value used for the previous data recording, as shown in FIG. 9. The same problem may also occur where recording of data is carried out using the same power as the optimum power value for the data, previously recorded, without the execution of the OPC procedure when the recorder ID code detected from the optical recording medium corresponds to the identification code of the recording apparatus.

Due to such a degradation in reproduction characteristics, reproduction errors may frequently occur, thereby making it impossible to recover the recorded data.

SUMMARY OF THE INVENTION

Therefore, an object of the invention is to provide a method for recording or reproducing data on or from an optical recording medium, and it comprises the steps of reading out a reference recording condition recorded on a specific area of the optical recording medium; recording test data while varying a recording condition with respect to the reference recording condition; determining an optimum recording power, based on reproduction characteristics of the test data; recording a recoding condition data including the optimum recording power, recording speed and write strategy type to be used or used to record data, on a specific area of the optical recording medium; recording data using the determined optimum recording power; and determining whether to use the recorded recording condition data in next recording mode to record new data.

Another object of the invention is to provide a method for recording or reproducing data on or from an optical recording medium, and it comprises the steps of reading out a reference recording condition data pre-recorded on an area of the optical recording medium; determining an optimum recording power for a specific recording speed, based on the reference condition data; recording an actual recoding condition data including the optimum recording power for the specific recording speed and a write strategy type for the specific recording speed to be used or used to record data, on a specific area of the optical recording medium; recording data using the determined optimum recording power; recording data at the actual recording speed and using the write strategy type for the specific recording speed; and determining whether to use the recorded actual recording condition data in next recording mode to record new data.

Another object of the invention is to provide a method for recording or reproducing data on or from an optical recording medium, and it comprises the steps of reading out a reference recording condition data pre-recorded on an area of the optical recording medium; determining an optimum recording power for a specific recording speed, based on the reference condition data; recording an actual recoding condition data including the optimum recording power for the specific recording speed and other recording parameters for the specific recording speed to be used or used to record data, on a specific area of the optical recording medium, wherein the actual recording condition data to be classified by at least different recording speed; recording data using the determined optimum recording power; recording data at the actual recording speed and using other recording parameters for the specific recording speed; and determining whether to use the recorded actual recording condition data in next recording mode to record new data.

Another object of the invention is to provide a method for recording or reproducing data on or from an optical recording medium, and it comprises the steps of reading out a reference recording condition data pre-recorded on an area of the optical recording medium; determining an optimum recording power for a specific recording speed, based on the reference condition data; and recording an actual recoding condition data including the optimum recording power for the specific recording speed and other recording parameters for the specific recording speed to be used or used to record data, on a specific area of the optical recording medium, wherein the actual recording condition data to be classified by at least one of different recording speed and different recorder ID.

Another object of the invention is to provide a recording medium, and the recording medium comprises a reference recording condition data recorded on an area of the recording medium; and an actual recoding condition data including an optimum recording power for a specific recording speed and a write strategy type for the specific recording speed to be used or used to record data on a user data area of the recording medium.

The further object of the invention is to provide a recording medium, and the recording medium comprises a reference recording condition data recorded on an area of the recording medium; and at least two actual recoding condition data classified by at least each different recording speed, each actual recording condition data including an optimum recording power for a specific recording speed and other recording parameters for the specific recording speed to be used or used to record data on a user data area of the recording medium.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Now, preferred embodiments of an optimal recording method for optical recording media in accordance with the present invention will be described.

The optical recording/reproducing apparatus illustrated in FIG. 1 may be used to implement the optimal recording method for optical recording media in accordance with the present invention. The optimal recording method of the present invention is characterized by additionally recording information about optimum recording conditions, detected by the execution of a procedure for detecting an optimum recording power value, on a count area B or a lead-in area of an optical recording medium 10, and subsequently determining, based on the optimum recording condition information, whether or not a procedure for detecting an optical recording power value is to be conducted. Sequential procedures of the optimal recording method according to the present invention are executed under the control of the microcomputer 100 shown in FIG. 1.

Figure 10:
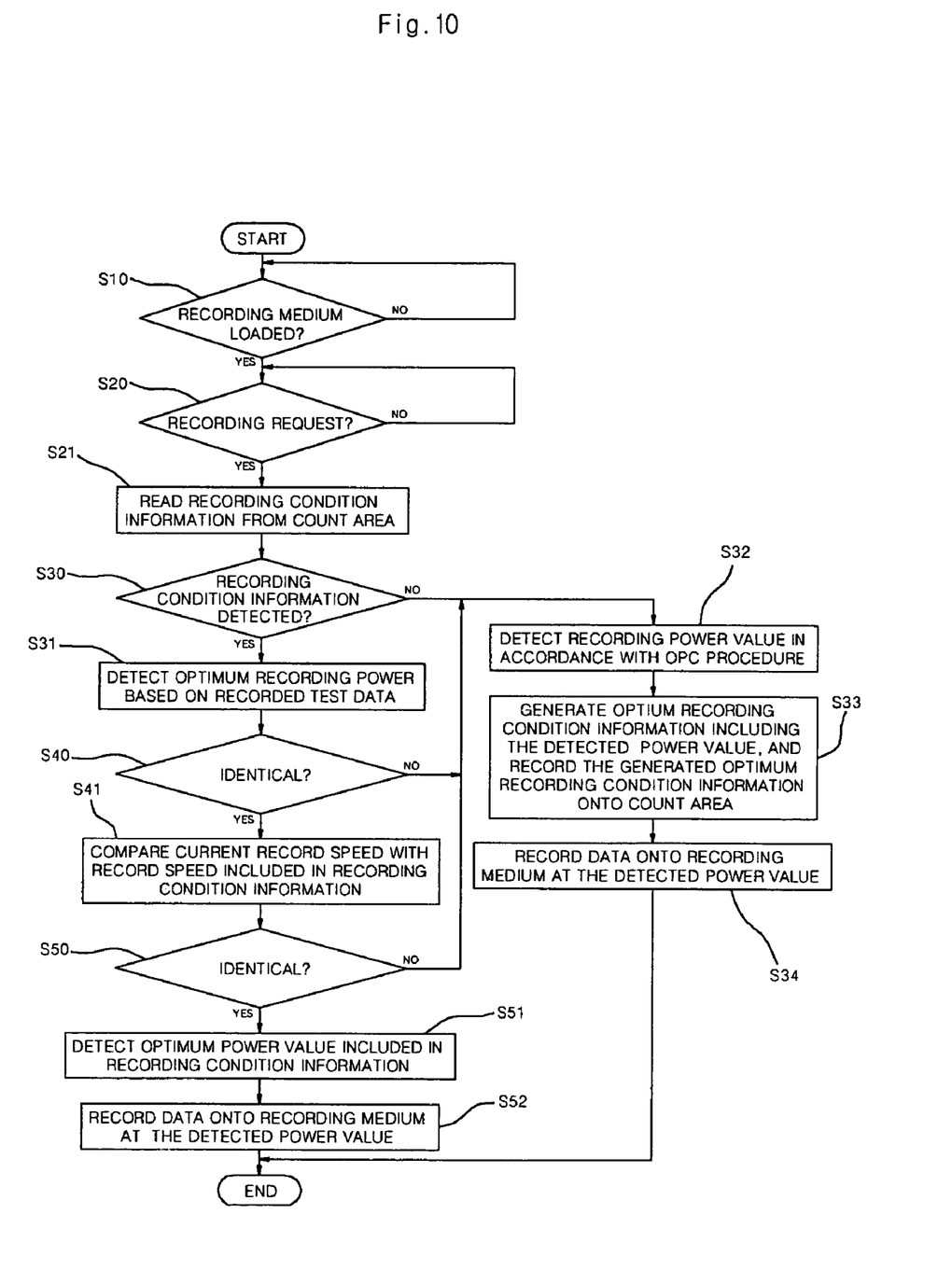
FIG. 10 is a flow chart illustrating an optimal recording method for optical recording media in accordance with a preferred embodiment of the present invention.

FIG. 10 is a flow chart illustrating an example of the optimum recording method for optical recording media according to the present invention.

In accordance with the present invention, the count area B of an optical recording medium 10 is defined to be written with information about optimum recording conditions detected in the above mentioned procedure for detecting an optimum recording power value in association with an optical recording medium. This optimum recording condition information additionally recorded is used for data to be subsequently recorded.

In accordance with this optimum recording method, the microcomputer 100 determines at first step S10 whether or not an optical recording medium is loaded in the optical recording/reproducing apparatus. When it is determined that an optical recording medium is loaded in the optical recording/reproducing apparatus, it is determined at step S20 whether or not a request for data recording is made. Where it is determined at step S20 that there is a data recording request, the microcomputer 100 reads a count area B included in a PCA area (FIG. 4) of the optical recording medium 10 in order to determine whether or not there is recording condition information on the count area B (Step S21).

Thereafter, the microcomputer 100 determines whether or not there is recording condition information on the count area B (Step S30). Where there is no recording condition information on the count area B, the microcomputer 100 conducts a procedure for detecting an optimum recording power value for the optical recording medium 10 because this state corresponds to a state in which there is no data recorded on the program area of the optical recording medium 10.

In order to execute the power detecting procedure, the control procedure of the microcomputer 100 proceeds to step S32. At step S32, the microcomputer 100 records test data onto the test area A of the optical recording medium 10, and then detects an optimum recording power value, based on the result of the recording of the test data. This power detecting procedure is conducted in the same fashion as the above mentioned conventional method.

When an optimum recording power value is detected for the optical recording medium 10 in accordance with the execution of step S32, the microcomputer 100 generates information about optimum recording conditions including the detected optimum recording power value. This optimum recording condition information is recorded onto the count area B of the optical recording medium 10 (Step S33).

Figure 11:
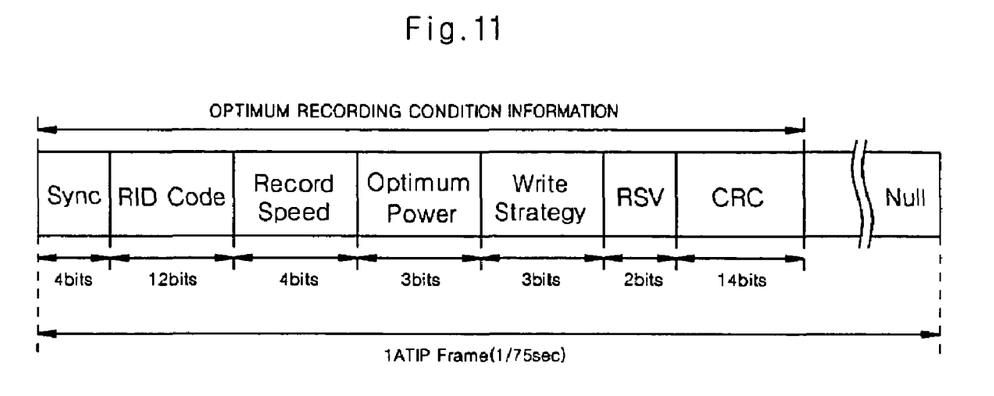
FIG. 11 is a diagram illustrating optimum recording condition information recorded on the count area of the optical recording medium in accordance with the present invention.

Here, the optimum recording condition information is information adapted to determine whether or not the procedure for detecting an optimum recording power value is to be conducted for recording of data. Referring to FIG. 11, such optimum recording condition information is illustrated. As shown in FIG. 11, the optimum recording condition information consists of 42-bit data including 4-bit sync data, 3-bit optimum power data indicative of the detected power value, a 12-bit RID code indicative of a recorder ID stored in a memory internally equipped in the microcomputer 100, 4-bit record speed data indicative of the current recording speed, 3-bit write strategy indicative of write strategy type, 2-bit reserved data, and 14-bit CRC data for error check, to be used or used to record data.

In addition to the 42-bit optimum recording condition information, null data may be written on the remaining area of the 1ATIP (1 Absolute Time In Pre-groove) frame. In order to obtain an enhanced reliability, the optimum recording condition information may also be repeatedly recorded within the length of the 1 ATIP frame.

After completing the optimum power detecting and recording procedures as described above, the microcomputer 100 controls the optical driver unit 50 to record input digital data onto the program area of the optical recording medium 10 starting from an initial position of the program area, using an optical drive current corresponding to the recorded power value (Step S34).

Now, a description will be made in conjunction with the case in which it is determined at step S30 that there is data recorded on the count area B, and the recording request at step S20 is not associated with overwriting of data, that is, the case in which data is written on the program area at a position following the initial position.

In this case, the microcomputer 100 identifies the information recorded on the count area. B of the optical recording medium 10, that is, information for determining whether or not the optimum recording power value detecting procedure is to be conducted.

To this end, the microcomputer 100 compares the recorder ID code, included in the optimum recording condition information, with the ID code of the optical recording/reproducing apparatus stored in the internal memory of the microcomputer 100, at step S31.

Based on the result of the comparison, the microcomputer 100 determines whether or not the recorder ID code of the optical recording/reproducing apparatus corresponds to the recorder ID code detected from the optical recording medium (Step S40). Where the ID cods are identical to each other, the microcomputer 100 then compares the current record speed with a record speed detected from the optical recording medium (Step S41). Based on the result of the comparison, the microcomputer 100 determines whether or not the two record speeds are identical to each other (Step S50).

When it is determined at step S50 that the current record speed corresponds to the record speed detected from the optical recording medium, this means that the optical recording medium 10 has been recorded with data, at least one time, at the same record speed as the current record speed, using the present optical recording/reproducing apparatus. In this state, accordingly, the microcomputer 100 identifies an optimum recording power value from the optimum recording condition information including the same record speed information as the current record speed information, without conducting the procedure for detecting an optimum power value at the data recording request (Step S51).

Since the identified power value is an optimum power value suitable for the optical system and circuit characteristics of the present optical recording/reproducing apparatus, the microcomputer 100 conducts recording of data on the optical recording medium 10, using the identified power value (Step S52).

However, where it is determined at step S40 that the two recorder ID codes are different from each other or where it is determined at step S50 that the two recode speeds are different from each other, the control procedure of the microcomputer 100 proceeds to step S32. At step 32, the microcomputer 100 executes the above mentioned optimum power value detecting procedure. Following step S32, the microcomputer 100 executes procedures for generating and recording information about optimum recording conditions (Steps S33 and S34).

Here, the case, in which there is a difference between the optical recording medium 10 and the optical recording/reproducing apparatus in terms of the recorder ID code or the recode speed information, corresponds to the case in which there is no occasion that the optical recording medium has been recorded with data, using the optical recording/reproducing apparatus.

This case may also correspond to the case in which the optimum recording condition information written on the optical recording medium 10 has been updated or deleted, on the basis of a determination for the optimum recording condition information to be useful no longer.

Also, this case may correspond to the case in which although a data recording operation has been conducted for the optical recording medium 10 by the optical recording/reproducing apparatus, its record speed is different from the current record speed.

In this case, accordingly, the procedures for detecting an optimum power value, generating information about optimum recording conditions, and recording the optimum recording condition information are carried out (Steps S32, S33, and S34).

Figure 12:
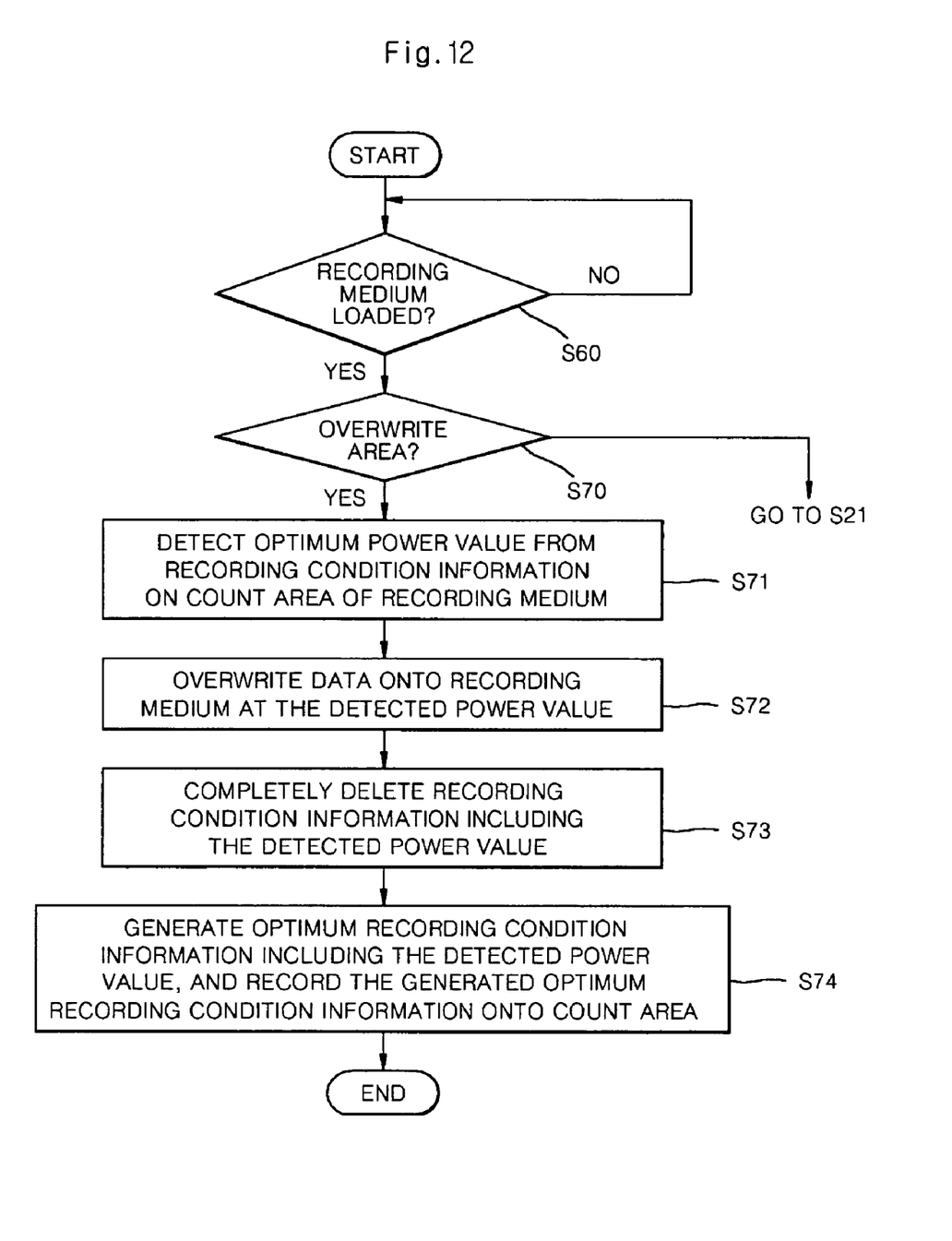
FIG. 12 is a flow chart illustrating an optimal recording method for optical recording media in accordance with another embodiment of the present invention.

FIG. 12 illustrates another embodiment of the optimal recording method for optical recording media according to the present invention.

The optimal recording method of FIG. 12 is associated with the case in which the recording request at step S20 of FIG. 11 corresponds to a data overwrite request.

In this case, the microcomputer 100 conducts, in response to the recording request, a control procedure to directly execute a data overwrite operation without determining whether or not the procedure for detecting an optimum recording power value based on the optimum recording condition information written on the count area B of the optical recording medium is to be carried out.

In accordance with this optimal recording method of FIG. 12, the microcomputer 100 first determines whether or not an optical recording medium is loaded in the optical recording/reproducing apparatus (Step S60). When it is determined that an optical recording medium is loaded in the optical recording/reproducing apparatus, it is determined whether or not a request for data recording made corresponds to a data overwrite request (Step S70). Where the data recording request corresponds to a data overwrite request, the microcomputer 100 identifies a highest power value from the recording condition information written on the count area B of the optical recording medium 10 (Step 71). Using the identified highest power value, the microcomputer 100 overwrites data on the optical recording medium 10 (Step S72).

This procedure is adapted to avoid a degradation in the characteristics of record signals occurring when overwriting of data is conducted at an optical power less than that used in the previous data recording.

After completing the data overwrite operation, the microcomputer 100 completely deletes the recording condition information written on the count area B of the optical recording medium 10 (Step S73). The reason why the recording condition information written on the count area B of the optical recording medium 10 is to be completely deleted will now be described.

Figure 13:
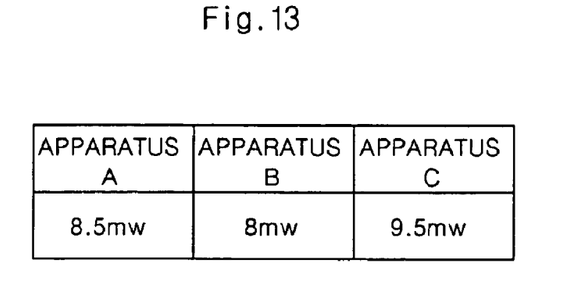
FIG. 13 is a table illustrating various optimum power values for optical recording/reproducing apparatuses of different types respectively.

For example, it is assumed that the optical recording medium 10 is recorded with various optimum power values for optical recording/reproducing apparatuses A, B, and C of different types respectively, as shown in FIG. 13.

Where the above mentioned procedure is carried out in this case, overwriting of data is conducted at a highest power value, that is, the power value of 9.5 mV associated with the optical recording/reproducing apparatus C. When data is recorded using the optical recording/reproducing apparatus B under the condition in which the optimum recording condition information of FIG. 13 is still maintained, a degradation in reproduction characteristics may occur because the power value of 8 mV less than the power value used in the previous data recording is used. In order to avoid this problem, the recording condition information written on the count area of the recording medium is completely deleted.

At step S74, the microcomputer 100 then generates again recording condition information including the identified recording power value, the current record speed, and the recorder ID code stored in the internal memory of the microcomputer 100. The generated recording condition information is then written on the initial portion of the count area B.

Alternatively, the optimum recording condition information may be recorded on respective lead-in areas of sessions in the case of a multi-session type optical recording medium.

Figure 14:
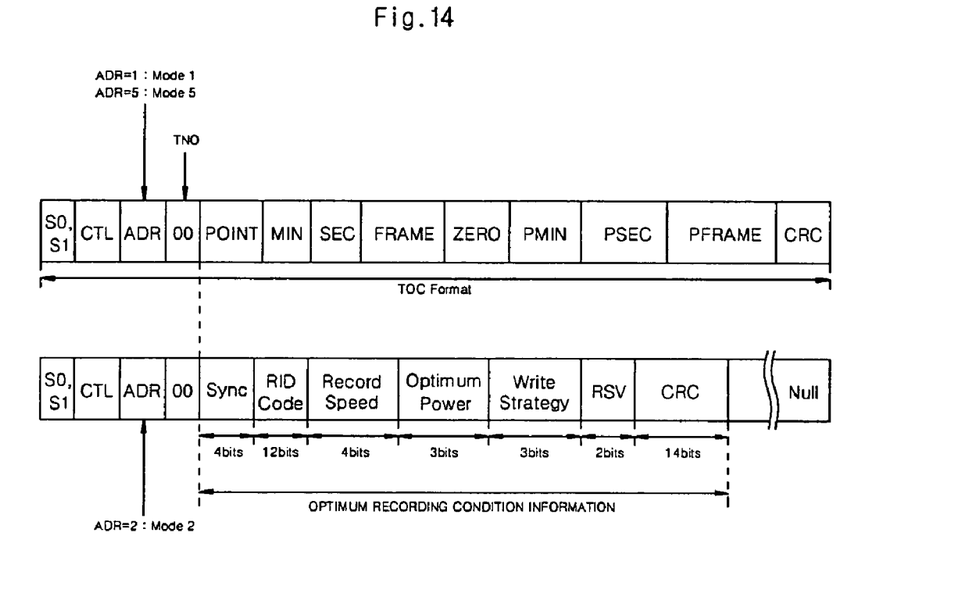
FIG. 14 is a diagram illustrating respective formats of TOC information and optimum recording condition information recorded on the lead-in area of the optical recording medium.

In this case, once an optimum recording power value is detected in accordance with the optimum recording power detecting procedure, that is, the OPC procedure, as mentioned above, desired data is recorded onto a track at the detected power value. After the recording of data, a session completion is made for that track. Thereafter, optimum recording condition information is written on the lead-in area of an associated session in the form of sub-queue data having a format of FIG. 14. At this time, the address of an address field for the optimum recording condition information is designated by a value other than values, previously designated, for example, values of "1" or "5". For example, the address value may be a value of "2". This value of "2" is recorded as a value indicative of the optimum recording condition information. Accordingly, it can be found that when the address value of an address field detected corresponds to "2", data following the address data is optimum recording condition information having the same format as that of FIG. 11.

Figure 15:
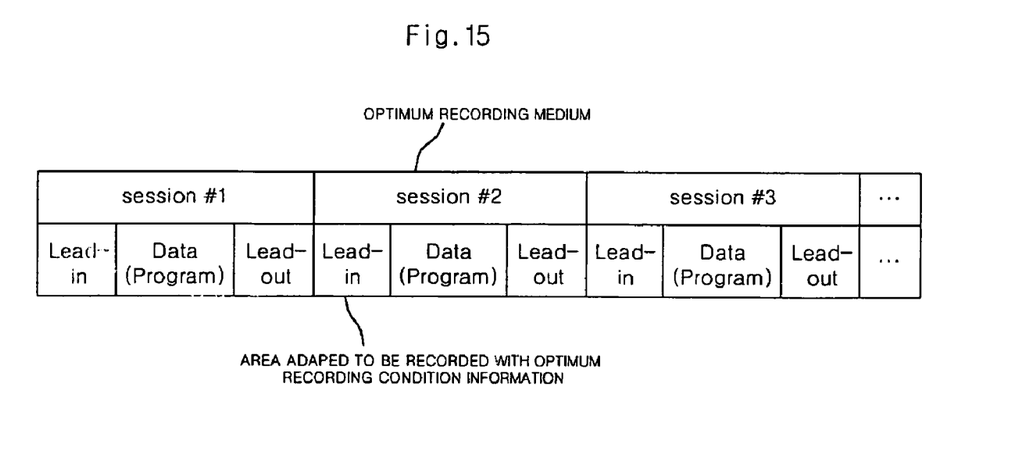
FIG. 15 is a diagram illustrating respective lead-in areas of sessions in an optical recording medium, each lead-in area being recorded with optimum recording condition information.

In accordance with such a recording procedure, optimum data recording condition information will be recorded for every session on the optical recording medium. FIG. 15 illustrates the recording format of an optical recording medium recorded with optimum recording condition information for every session. As shown in FIG. 15, optimum recording condition information is written on the lead-in area of each session.

Where an optical recording medium recorded with data for every session is loaded in the optical recording/reproducing apparatus A in order to record data thereon, and when a request for overwriting data on a particular session is made, the microcomputer of the optical recording/reproducing apparatus A detects an optimum recording power value from the optimum recording condition information written on the lead-in area of the particular session designated for the data overwriting.

For example, if the detected optimum recording power value is 10 mW different from that of the present optical recording/reproducing apparatus A, this optical recording/reproducing apparatus A does not record data at the detected power value of 10 mV. In this case, the optical recording/reproducing apparatus A derives an optimum recording power value for the optical recording/reproducing apparatus A corresponding to the detected optimum recording power value of 10 mW. Where data is recorded on an optical recording medium using an optical recording/reproducing apparatus at an optimum recording power value detected by another optical recording/reproducing apparatus, the recording of data may be practically carried out at a power value more or less than the optimum recording power value used for the optical recording medium because respective optical driver units of those optical recording/reproducing apparatuses may have different offset values. In order to avoid such a situation, an optimum recording power value is derived based on the detected optimum recording power value, as mentioned above.

Also, where data is overwritten on the optical recording medium at a power value more than the power value used in the previous data recording, a degradation in reproduction characteristics may occur. Although a reduction in jitter occurs for a certain number of overwrite times, as indicated by an interval "C" in FIG. 8, a sharp increase in jitter exceeding an allowable range occurs following the interval "C". In order to avoid such a situation, it is avoided to overwrite data at a power value more than the power value used in the previous data recording.

In order to derive an optimum recording power value for the present optical recording/reproducing apparatus A corresponding to the detected optimum recording power value used for the previous data recording, the microcomputer of the optical recording/reproducing apparatus A conducts the above mentioned OPC procedure, thereby deriving a modulation degree curve as shown in FIG. 6. Thereafter, the microcomputer reproduces data from a session designated for the data overwriting, thereby deriving a degree of modulation for a particular signal component, for example, an 11T component. A recording power value corresponding to the degree of modulation associated with the session to be overwritten with data is derived from the modulation degree curve derived in the OPC procedure. The derived recording power value is the recording power value for the present optical recording/reproducing apparatus A corresponding to 10 mW, that is, the optimum recording power value for the optical recording/reproducing apparatus used in the previous data recording. The microcomputer of the optical recording/reproducing apparatus A overwrites input data onto the designated session at the derived power value.

Although the optical recording/reproducing apparatus A records data onto the optical recording medium at a recording power value identical to the previous power value, it may achieve the recording of data in a different fashion by deriving an optimum recording power value in accordance with an OPC procedure, comparing the derived power value with the recording power value used for the previous data recording, and overwriting input data at the derived recording power value when the derived recording power value is not less than the previous recording power value.

It is desirable for this method to be conducted in the case in which there is a high possibility of a degradation in the reproduction characteristics of overwritten data occurring, when the overwriting of data is conducted using a recording power value used in a previous data recording, due to a considerable difference of the recording power value from a desired optimum recording power value.

As apparent from the above description, the present invention provides an optimal recording method for optical recording media which is capable of additionally recording information about optimum recording conditions on the count area or lead-in area of an optical recording medium in order to allow a subsequent recording of data on the optical recording medium, using an optimum recording power value included in the recorded optimum recording condition information.

Therefore, in accordance with the present invention, it is possible to prevent a degradation in the reproduction characteristics of overwritten data from occurring when the power value used in the overwriting of the data is less than the power value used in the previous data recording.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for recording data on an optical recording medium via a recording apparatus including an optical pickup unit and a controller, the method comprising:
    determining, via the optical pickup unit under control of the controller, whether a recording condition data for a current recording device is present on a specific area of the optical recording medium; and
    selectively recording, via the optical pickup unit under control of the controller, the recording condition data for the current recording device based on the determination, wherein the recording is performed if there is no recording condition data for the current recording device, said selectively recording step including:
    reading out, via the optical pickup unit under control of the controller, a reference recording condition information recorded on the specific area of the optical recording medium, the reference recording condition information including a reference recording power value,
    recording, via the optical pickup unit under control of the controller, test data while varying a recording condition with respect to the reference recording condition information,
    obtaining, via the controller, an optimum recording power, based on reproduction characteristics of the test data, and
    recording, via the optical pickup unit under control of the controller, the recording condition data for the current recording device on the specific area of the optical recording medium, the recording condition data including an identification of the current recording device, the optimum recording power and write strategy to be used or used to record main data other than the test data on the recording medium,
    wherein the optimum recording power and the write strategy of the recording condition data are distinguished by different recording speeds.

2. The method of claim 1, further comprising:
    recording the main data using the obtained optimum recording power on a user data area of the optical recording medium.

3. The method of claim 2, further comprising:
    determining whether to use the recorded recording condition data in a next recording mod to record new main data.

4. The method of claim 1, wherein the specific area is a lead-in area or an area inner than the lead-in area of the optical recording medium.

5. The method of claim 1, wherein the recording the recording condition data for the current recording device on the specific area of the optical recording medium records the recording condition data repeatedly on the specific area.

6. The method of claim 1, wherein the recording the recording condition data for the current recording device on the specific area of the optical recording medium further records a synch code as the recording condition data.

7. The method of claim 1, wherein the determining step includes comparing an identification of a previous recording condition data recorded in the specific area of the optical recording medium with an identification stored in memory of the current recording device, thereby determining whether the recording condition data for the current recording device is present.

8. The method of claim 1, wherein the recording condition data corresponds to a current recording of data on the optical recording medium and is to be used by a subsequent recording of the main data on the optical recording medium.

9. The method of claim 1, wherein the recording condition data for the current recording device is selectively recorded on the specific area of the optical recording medium according to a recording speed.

10. A computer readable recording medium including information useable by a recording device, the computer readable recording medium comprising:
    a recording layer including a specific area having a reference recording condition data recorded thereon, the reference recording condition data being previously recorded and including a reference recording power value, and at least two recording condition data recorded on the specific area of the recording medium respectively for at least two different recording devices, each recording condition data being different from the reference recording condition data and including an identification of a corresponding recording device, an optimum recording power obtained by a test recording and a write strategy to be used or used to record main data other than the test data on a user data area of the recording medium,
    wherein new recording condition data for a new recording device is recorded on the specific area only if the at least two recording condition data does not contain the new recording condition data for the new recording device, and
    wherein the optimum recording power and the write strategy of the recording condition data are distinguished by different recording speeds.

11. The recording medium of claim 10, wherein the specific area is a lead-in area or an area inner than the lead-in area of the recording medium.

12. The recording medium of claim 10, wherein each recording condition data is recorded repeatedly on the specific area of the recording medium.

13. The recording medium of claim 10, wherein each recording condition data is recorded repeatedly at a predetermined interval.

14. The recording medium of claim 10, wherein each recording condition data further includes a synch code.

15. The recording medium of claim 10, wherein the recording condition data for a current recording device is selectively recorded on the specific area of the optical recording medium according to a recording speed.

16. A method for recording data on an optical recording medium via a recording apparatus including an optical pickup unit and a controller, the method comprising:
   determining, via the optical pickup unit under control of the controller, whether a recording condition data for a current recording device is recorded on a specific area of the optical recording medium; and
   recording, via the optical pickup unit under control of the controller, the recording condition data for the current recording device if there is no recording condition data for the current recording device, said recording step (b) including:
   reading out, via the optical pickup unit under control of the controller, a reference recording condition data recorded on the specific area of the optical recording medium, the reference recording condition data including a reference recording power value;
   obtaining, via the controller, an optimum recording power based on the reference recording condition data; and
   recording, via the optical pickup unit under control of the controller, the recording condition data for the current recording device on the specific area of the optical recording medium, the recording condition data including an identification of a current recording device, the optimum recording power, and a write strategy type to be used or used to record main data other than the test data on a user area of the optical recording medium,
   wherein the optimum recording power and the write strategy type of the recording condition data are distinguished by different recording speeds.

17. The method of claim 16, further comprising:
   recording the main data using the determined optimum recording power.

18. The method of claim 16, further comprising:
   recording the main data at a specific recording speed.

19. The method of claim 16, further comprising:
   determining whether to use the recorded recording condition data in a next recording mode to record new main data.

20. The method of claim 16, wherein the recording the recording condition data for the current recording device on the specific area of the optical recording medium records the recording condition data repeatedly on the specific area.

21. The method of claim 16, wherein the recording the recording condition data for the current recording device on the specific area of the optical recording medium records the recording condition data of the current recording device subsequently in an area where a recording condition data for a different recording device has been recorded, if the recording condition data for the different recording device has been recorded.

22. The method of claim 16, wherein the determining step includes comparing an identification of a previous recording condition data recorded in the specific area of the optical recording medium with an identification stored in memory of the current recording device, thereby determining whether the recording condition data for the current recording device is present.

23. The method of claim 16, wherein the recording condition data corresponds to a current recording of the main data on the optical recording medium and is to be used by a subsequent recording of data on the optical recording medium.

24. The method of claim 16, wherein the recording condition data for the current recording device is selectively recorded on the specific area of the optical recording medium according to a recording speed.

25. An apparatus for recording or reproducing data on or from an optical recording medium, the apparatus comprising:
   an optical pickup unit configured to record or read data on or from the optical recording medium; and
   a controller configured to control a recording operation of data,
   wherein the controller is configured to control the optical pickup unit to read a reference recording condition information recorded on an area of the optical recording medium, to record test data while varying a recording condition with respect to the reference recording condition information, to obtain a recording condition data based on reproduction characteristics of the test data and to record the recording condition data for the apparatus on a specific area of the optical recording medium, and
   wherein the recording condition data includes an optimum recording power and a write strategy to be used or used to record the data and an identification of the optical recording apparatus, and
   wherein the optimum recording power and the write strategy of the recording condition data are distinguished by different recording speeds.

26. The apparatus of claim 25, wherein the controller is further configured to control the optical pickup unit to record the data using the obtained optimum recording power on a user area of the optical recording medium.

27. The apparatus of claim 26, wherein the controller is further configured to determine whether to use the recorded recording condition data in next recording operation to record new data.

28. The apparatus of claim 25, further comprising:
   a signal processor configured to process data to be recorded or reproduced.

29. The apparatus of claim 25, wherein the recording condition data for a current recording is selectively recorded on the area of the optical recording medium according to a recording speed.

* * * * *